US005325711A

United States Patent [19]

Hamburg et al.

[11] Patent Number: 5,325,711

[45] Date of Patent: Jul. 5, 1994

[54] AIR-FUEL MODULATION FOR OXYGEN SENSOR MONITORING

[75] Inventors: Douglas R. Hamburg, Bloomfield Hills; Thomas S. Gee, Canton; Thomas A. Schubert, Novi; Paul F. Smith, Dearborn Heights, all of Mich.

[73] Assignee: Ford Motor Company, Dearborn, Mich.

[21] Appl. No.: 88,296

[22] Filed: Jul. 6, 1993

[51] Int. Cl.[5] .......... G01M 15/00

[52] U.S. Cl. .......... 73/118.1

[58] Field of Search .......... 73/118.1, 116, 117.3

[56] References Cited

U.S. PATENT DOCUMENTS 5,020,499 6/1991 Kojima et al. .......... 123/479

5,212,947 5/1993 Fujimoto et al. .......... 73/118.1

*Primary Examiner*—Robert Raevis

*Attorney, Agent, or Firm*—Roger L. May; Peter Abolins

[57] ABSTRACT

Method, for controlling fuel supply to an internal combustion engine utilizing a modulated air-fuel signal having a modified square-wave waveform, of monitoring operation of an oxygen sensor for sensing engine exhaust gas oxygen level. The method includes generating the modulated air-fuel signal having the modified square-wave waveform designed to produce a particular engine exhaust response for interrogating the oxygen sensor, and operating the engine based on the modulated air-fuel signal. The oxygen sensor produces an associated output signal in response to sensed exhaust gas oxygen levels. The method also includes processing the output signal of the oxygen sensor associated with the particular engine response so as to determine the operating condition of the oxygen sensor and to verify acceptable test conditions.

21 Claims, 8 Drawing Sheets

AIR-FUEL MODULATION FOR OXYGEN SENSOR MONITORING

TECHNICAL FIELD

The present invention relates to a method and apparatus for modulating air-fuel (A/F) ratio for oxygen sensor monitoring.

BACKGROUND ART

As part of the California Air Resources Board (CARB) On-Board Diagnostics (OBD-II) regulations, the capability for on-board monitoring of a vehicle's pre-catalyst exhaust gas oxygen sensor (O2S) operation must be provided by vehicle manufacturers beginning with the 1994 model year. Typically, the oxygen sensor generates a nearly sinusoidal voltage signal, the amplitude of which can be used as a fingerprint of the sensor operating condition. For example, an attenuated signal can indicate sensor degradation and/or failure.

One technique which complies with the regulations utilizes external air-fuel modulation applied to the engine fuel controller in order to obtain a well-defined signal with which to interrogate the oxygen sensor. Previous implementations of this concept have applied the A/F modulation under openloop conditions. For example, U.S. Pat. No. 5,020,499, issued to Kojima et al., discloses an apparatus for detecting an oxygen sensor abnormality and controlling A/F ratio. Such implementations have experienced difficulties, however, because the mean value of the A/F ratio tends to drift during the test. Although the oxygen sensor switches at the appropriate value, the A/F ratio in the exhaust drifts away from stoichiometry, causing the sensor to react undesirably.

It is, therefore, desirable to ensure that the A/F modulation produces a well-controlled interrogation signal so that the oxygen sensor will react in a well-defined manner, consistent from test to test.

SUMMARY OF THE INVENTION

It is an object of the present invention to provide a method and apparatus for modulating A/F ratio so as to produce a well-controlled sensor interrogation signal.

In carrying out the above object, and other objects and features of the present invention, there is provided a method, for use with a vehicle including an electronic control unit for controlling fuel supply to an internal combustion engine having an oxygen sensor for sensing engine exhaust gas oxygen level, of monitoring operation of the sensor. The method comprises generating a modulated air-fuel signal having a modified square-wave waveform, the modified square-wave waveform being designed to produce a particular engine exhaust response for interrogating the oxygen sensor. The method also comprises operating the engine based on the modulated air-fuel signal, the oxygen sensor producing an associated output signal in response to sensed exhaust gas oxygen levels, and processing the output signal of the oxygen sensor associated with the particular engine response so as to determine the operating condition of the oxygen sensor.

In one embodiment, the method further comprises applying a plurality of forced fuel excursions at a predetermined frequency to the engine utilizing the modulated air-fuel signal, and processing the output signal of the sensor to determine a response frequency of the sensor to the forced fuel excursions. The method also comprises comparing the predetermined frequency of the forced fuel excursions to the response frequency of the sensor, verifying acceptable test conditions based on the comparison, and identifying an operating condition of the sensor based on sensor output amplitude.

Apparatus is also provided for carrying out the method.

The advantages accruing to the present invention are numerous. For example, the mean value of the A/F ratio remains relatively constant during the OBD-II test, resulting in a consistent oxygen sensor waveform and repeatable engine emissions. In one embodiment, the invention permits verification that the response frequency of the fuel control system matches the driven frequency of a sensor monitor test, providing improved confidence that the test was not inappropriately affected by external factors.

The above object and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
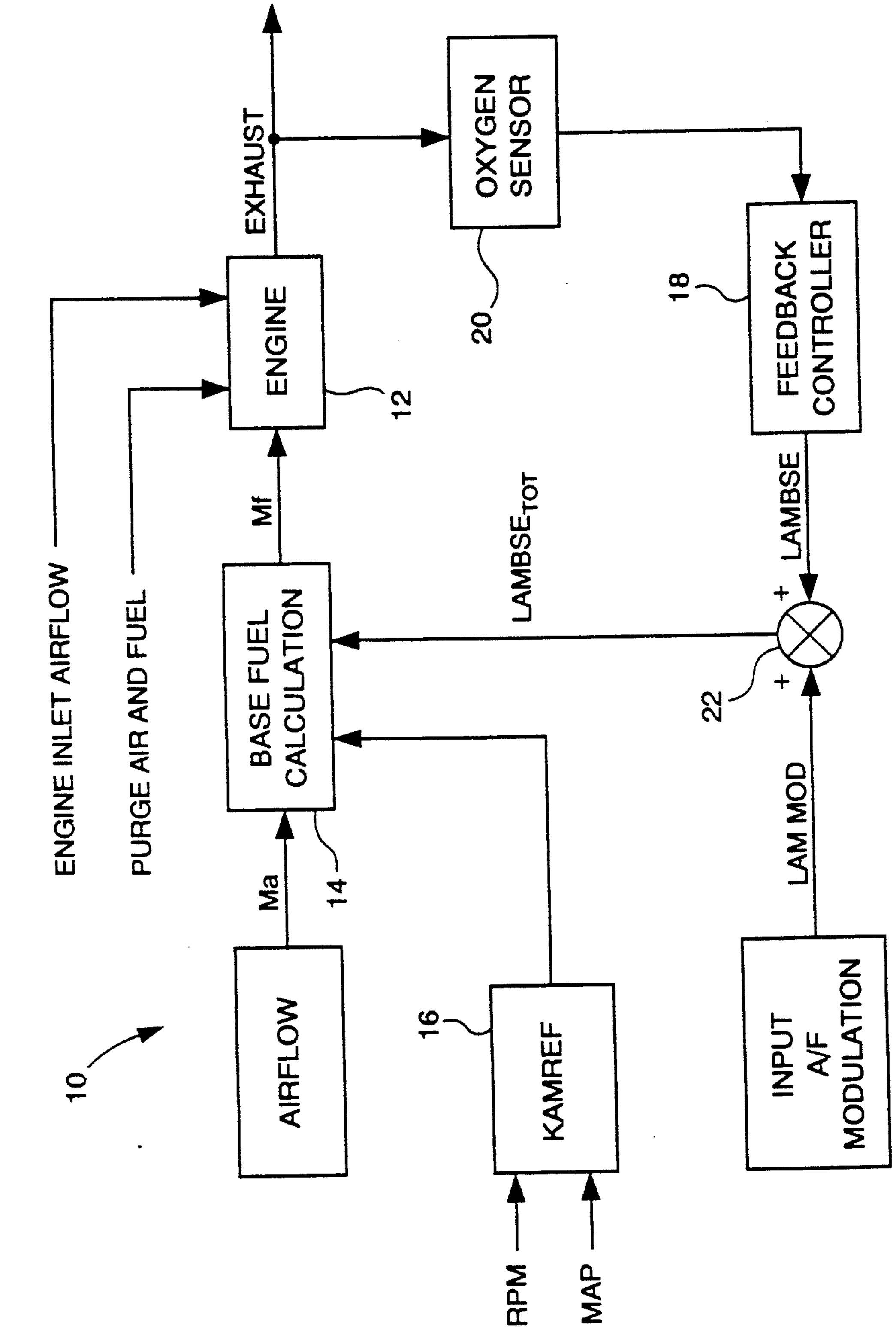
FIG. 1 is a block diagram representation of an air-fuel feedback control system, for use with a vehicle having a spark-ignited internal combustion engine, according to the present invention.

Referring now to FIG. 1, there is illustrated a block diagram of an air-fuel feedback control system shown generally by reference numeral 10, for use with a vehicle including a spark-ignited internal combustion engine 12. As described in greater detail below, the system 10 provides closed-loop air-fuel modulation for oxygen sensor monitoring. A mass fuel flow signal is generated by the base fuel calculation block 14 and provided to the engine 12. As FIG. 1 suggests, the modulation will cause the value of the engine fuel flow to cyclically increase and decrease as determined by the base fuel calculation algorithm.

At any instant of time, the mass fuel flow value (Mf) determined by the fuel calculation algorithm is equal to the mass engine airflow (Ma), which can be either calculated or measured, multiplied by a calculated value (KAMREF) obtained from a non-volatile memory 16 of the vehicular electronic control unit. To obtain the mass fuel flow, this quantity is then divided by the product of $LAMBSE_{TOT}$ and the constant 14.7:

$$Mf = \frac{Ma*KAMREF}{LAMBSE_{TOT}*14.7}$$

As shown in FIG. 1, the base fuel calculation is also based on the signal $LAMBSE_{TOT}$, a modulated air-fuel signal obtained by summing the normal air-fuel feedback signal (LAMBSE) generated by the feedback controller 18 with an input air-fuel modulation signal (LAM MOD). The output signal of an oxygen sensor 20, such as an exhaust gas oxygen sensor, which monitors the exhaust gases, is provided as an input to the feedback controller 18.

In the preferred embodiment, the input air-fuel modulation signal is generated by software in the engine control unit. In this manner, arbitrary air-fuel waveforms having selectable amplitudes and frequencies can readily be generated. Although many different choices are possible and would work quite satisfactorily, the preferred modulation waveform is a square wave having a frequency of approximately 2 Hertz (set slightly higher than the natural frequency of the system) and an amplitude which provides peak-to-peak fluctuation in the normalized engine air-fuel ratio [i.e., $(A/F_{engine})/(A/F_{stoich})$] of approximately 10%–20%.

With continuing reference to FIG. 1, the input air-fuel modulation signal is most preferably applied to the engine fuel controller by adding it to the normal air-fuel feedback signal (LAMBSE) by summer 22 in the engine control unit Since the input air-fuel modulation signal is added to LAMBSE to form $LAMBSE_{TOT}$, the resulting A/F modulation amplitude will be a fixed percentage of the normalized engine air-fuel ratio, and will be independent of the actual value of the engine airflow.

Figure 2:
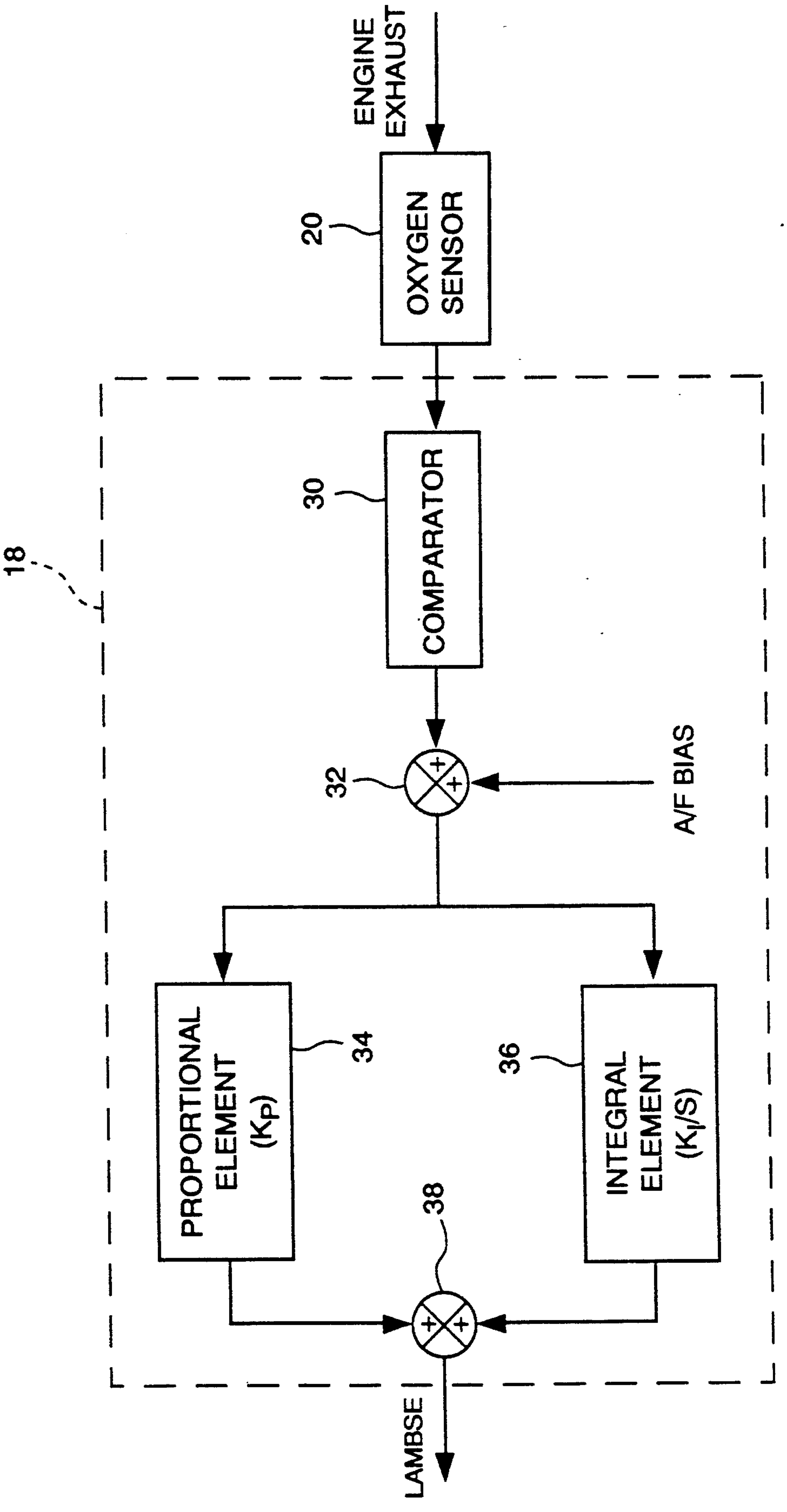
FIG. 2 is a block diagram representation of the feedback (proportional/integral) controller shown in FIG. 1.
Figure 3:
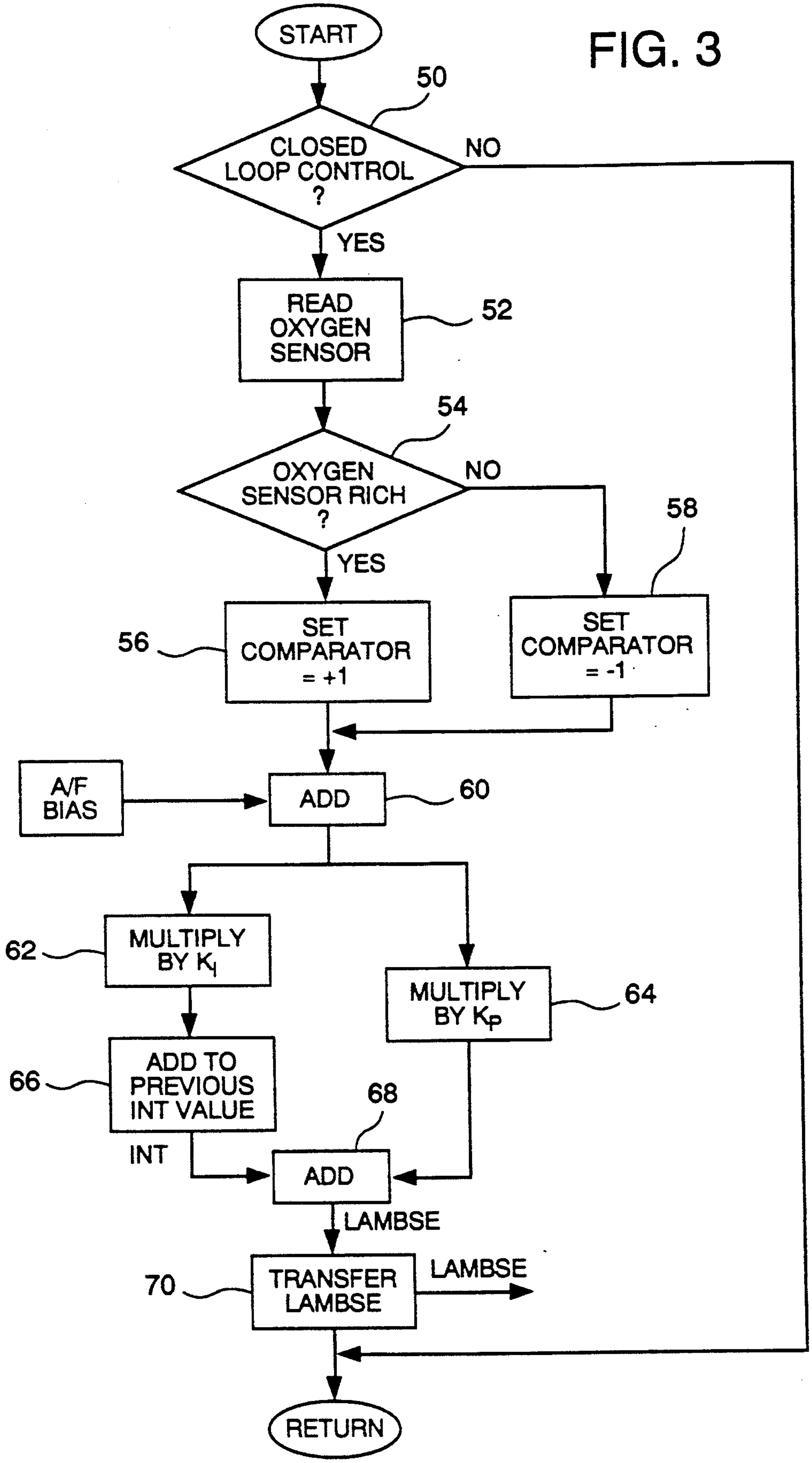
FIG. 3 is a flowchart detailing the implementation of the feedback controller shown in FIG. 2 for generation of the normal A/F feedback signal (LAMBSE)

Referring now to FIGS. 2 and 3, there is shown a block diagram representation of the feedback controller 18 and a flowchart detailing the steps for implementing the controller, respectively. As shown, the feedback controller 18 includes a comparator 30, a summer 32, proportional element 34, integral element 36 and a summer 38 which cooperate as shown to generate the normal air-fuel signal LAMBSE based on the oxygen sensor 20 output voltage.

With continuing reference to the figures, at step 50 of FIG. 3, a check is made to determine if engine operating conditions, such as time-since-start, are proper for closed-loop operation. When conditions are proper for closed-loop operation, the feedback controller reads the oxygen sensor output at step 52. At step 54, the controller determines whether the oxygen sensor output indicates the engine air-fuel is rich or lean of stoichiometry. If the sensor output is on the rich side, the output of the comparator 30 is set to a value of +1 at step 56, whereas the output of the comparator is set to a value of −1 at step 58 when the air-fuel is on the lean side of stoichiometry. In either case, control flow then skips to step 60, wherein the comparator output is summed by summer 32 of FIG. 2 with an air-fuel bias value obtained from the oxygen sensor bias table, preferably stored in the non-volatile memory of the vehicular control unit.

With continuing reference to FIG. 3, the logic flow is then split and directed to steps 62 and 64. At step 62, the output of summer 32 is multiplied by an integral gain constant $K_I$ and at step 66 this product is added to the product determined in the previous loop to obtain the integral term of the feedback signal LAMBSE. At step 64, the output of summer 32 is multiplied by the proportional gain constant $K_P$ to obtain the proportional term of LAMBSE.

As shown, the integral term and the proportional terms are then combined at step 68 by the summer 38 shown in FIG. 2 to form the composite feedback signal LAMBSE. At step 70, LAMBSE is transferred to the summer 22 of FIG. 1 where it is combined with the input air-fuel modulation signal LAM MOD, at which point the above-described routine is repeated.

Figure 4:
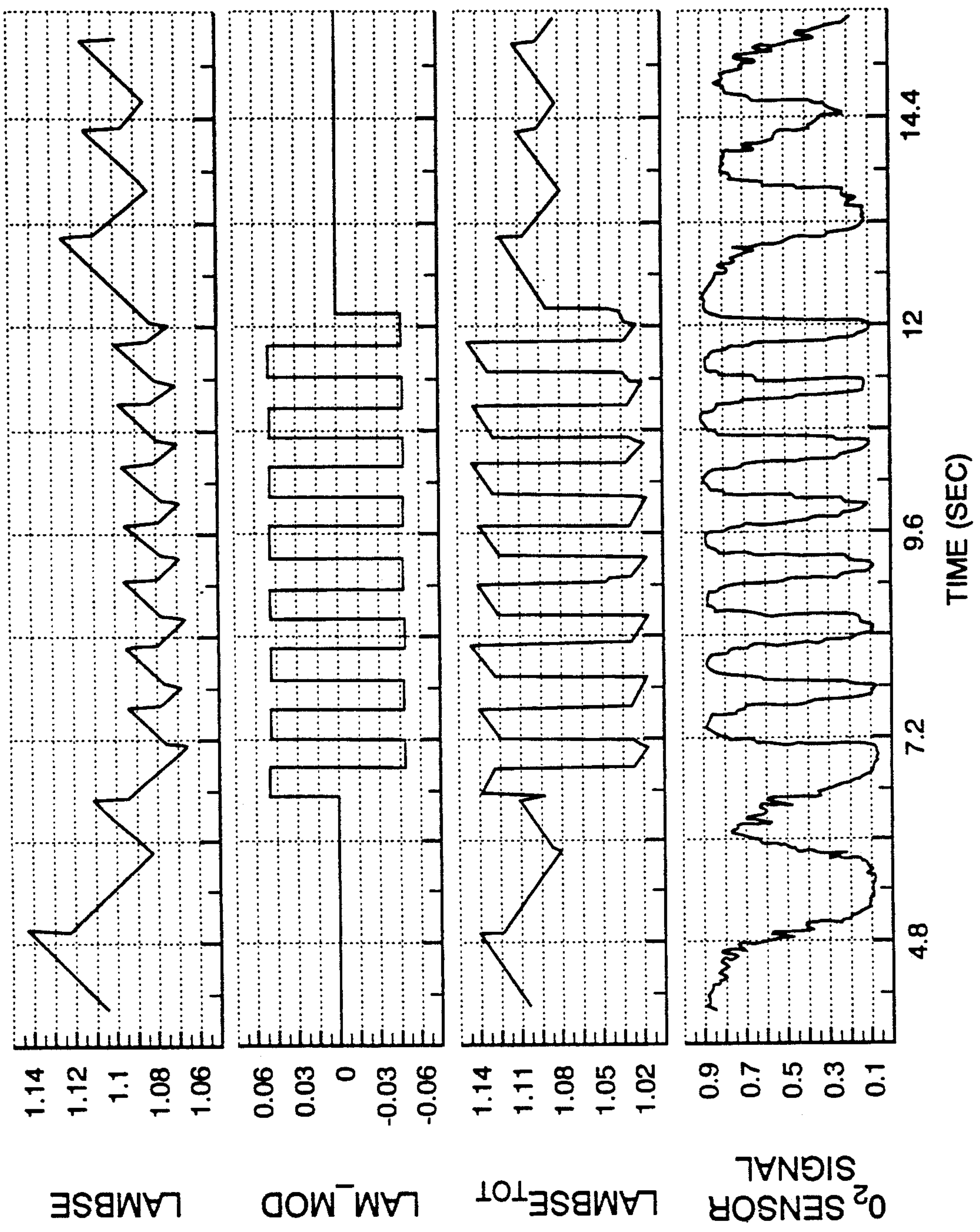
FIG. 4 is a graphical illustration of the normal A/F feedback signal (LAMBSE), the input A/F modulation signal (LAM MOD), the modulated air fuel signal ($LAMBSE_{TOT}$), and the oxygen sensor output signal.

With reference now to FIG. 4, there is shown a graphical illustration of the relationship between LAMBSE, $LAMBSE_{TOT}$, and the oxygen sensor output signal over time with about a 1.5 Hz input air-fuel modulation signal (LAM MOD). As shown, the system responds at a frequency substantially equal to that of LAM MOD, even though the oxygen sensor output is slightly out of phase. This later effect is indicated by the "glitches" shown in the $LAMBSE_{TOT}$ waveform.

Figure 5:
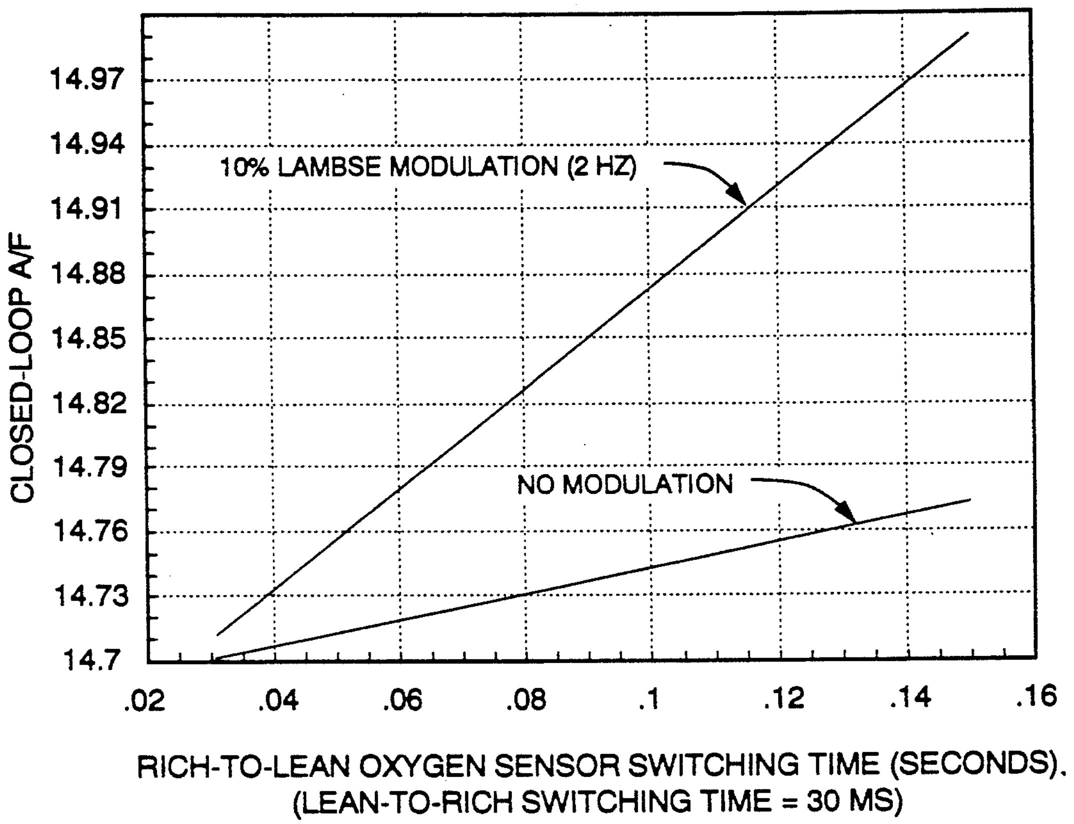
FIG. 5 is a graphical illustration of the shift in closed-loop air-fuel ratio resulting from a particular modulation and asymmetrical rich-to-lean versus lean-to-rich switching times inherent to the oxygen sensor.

The value of the closed-loop engine A/F can shift when this modulation scheme is applied with a frequency which is greater than the normal closed-loop limit-cycle frequency. This effect is due to the rich-to-lean and lean-to-rich switching times of the oxygen sensor being different from one another. Such a shift in air-fuel is illustrated in FIG. 5, which shows the closed-loop air-fuel versus the rich-to-lean switching time of a oxygen sensor for both normal (i.e. no modulation) closed-loop operation and for the situation in which a 2 Hertz modulation is applied. In order to insure that a shift in air-fuel such as that shown in FIG. 5 does not occur when modulation is applied, in the preferred embodiment the oxygen sensor bias table values are altered during the time interval when the modulation is being applied. The changes in the bias table values can be made based on pre-programmed offset values stored in non-volatile memory of the engine control computer. These pre-programmed offset values can be determined experimentally by finding the values which produce lowest tailpipe emissions while the forced fuel excursions are present. Preferably, the pre-programmed offset values should be set such that the mean value of LAMBSE will not change significantly when the air-fuel modulation signal is applied.

Figure 6:
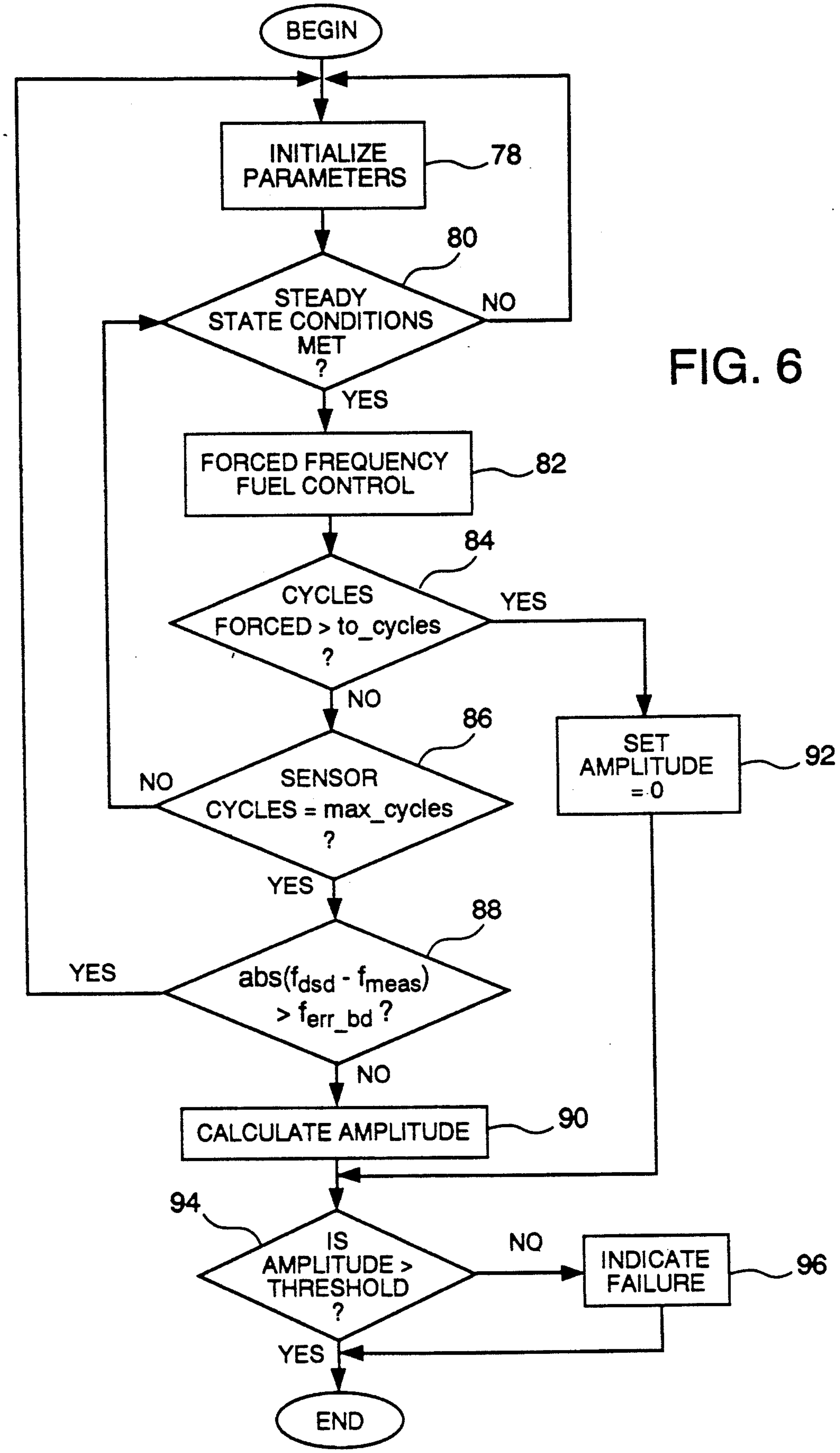
FIG. 6 is a flowchart detailing a first methodology for monitoring operation of the oxygen sensor according to the present invention.

With reference now to FIG. 6, the closed-loop air-fuel modulation concept of the present invention also insures proper operation of an oxygen sensor monitoring scheme. Generally, the flowchart shown in FIG. 6 provides a methodology whereby the oxygen response rate can be verified prior to accepting the results. This frequency check is called during oxygen sensor monitoring. For example, verifying that the response frequency of the fuel control system matches the driven frequency of the sensor monitor test provides improved confidence that the test was not adversely affected by external factors, such as throttle actuation, load variations and the like.

With continuing reference to FIG. 6, at step 78, the test is initialized and flow proceeds to step 80, at which point the controller determines whether or not steady state conditions, such as engine speed, vehicle speed, load and temperature, and the like, are met. Once the conditions are met, at step 82 a flag (LAM_MOD_FLG) is set indicating forced frequency fuel control as defined by above discussion is being executed.

Steps 84 and 86 cooperate to implement a time-out feature which ensures the forced-fuel modulation test will eventually terminate. Without this feature, if the oxygen sensor fails to switch during a fuel modulation sequence, the test would not terminate. Two variables, to_cycles and max_cycles, are utilized to implement the feature. Ideally, the oxygen sensor would switch for each fuel excursion cycle. However, it is not particularly desirable to fail a sensor if it is not switching cycle for cycle with the forced fuel excursions. Therefore, some difference between driven and response frequency is accepted and in one embodiment, to_cycles has a value that is about twice that of max_cycles, such that sensors are failed only if the sensor response frequency is less than half that of the forced frequency.

Thus, as the forced fuel excursions occur, steps 80-86 are repeated for example every 50 mS, keeping track of the number of fuel cycles, the number of associated sensor responses, and whether steady-state conditions are still met. This loop is exited if any one of three events occurs: if steady state conditions no longer exist (step 80), control flow proceeds to step 78; if the number of forced fuel cycles exceeds to_cycles (at step 84), then control flow proceeds to step 92; and if the number of forced fuel cycles does not exceed to_cycles, but the sensor has cycled or responded (i.e. switched) max_cycles times (step 86), then control flow proceeds to step 88.

As shown in FIG. 6, at step 88 the controller determines whether the forced fuel frequency was acceptable, by taking the absolute value of the difference between the forced frequency (i.e. $f_{dsd} \approx 2$ Hz) and the response frequency measured ($f_{meas}$), and comparing the difference to a predetermined limit ($f_{err-bd} \approx 0.2$ Hz or $\pm 10\%$). If the difference is not within the prescribed limit, sensor operation is suspect and control flow skips back to step 78 and the test is rerun. If, however, the difference is within the frequency error band, the test is considered valid and control flow proceeds to step 90, wherein the sensor output amplitude is measured. Typically, acceptable sensor amplitudes would be in the range of 0.5–0.9 $V_{pp}$.

If at step 84 the system had tried to force more than to_cycles number of fuel excursions before the sensor had switched max_cycles times, there is a high probability that the sensor is faulty, control flow would proceed to step 92, and the variable representing sensor amplitude would be set to zero. At step 94, the sensor amplitude is compared to a predetermined amplitude threshold, such as 0.5 $V_{pp}$. If the actual amplitude does not exceed the threshold, control flow proceeds to step 96 and a sensor failure is indicated. If, however, the actual amplitude does exceed the threshold, there is no sensor failure and the routine is exited.

Figure 7:
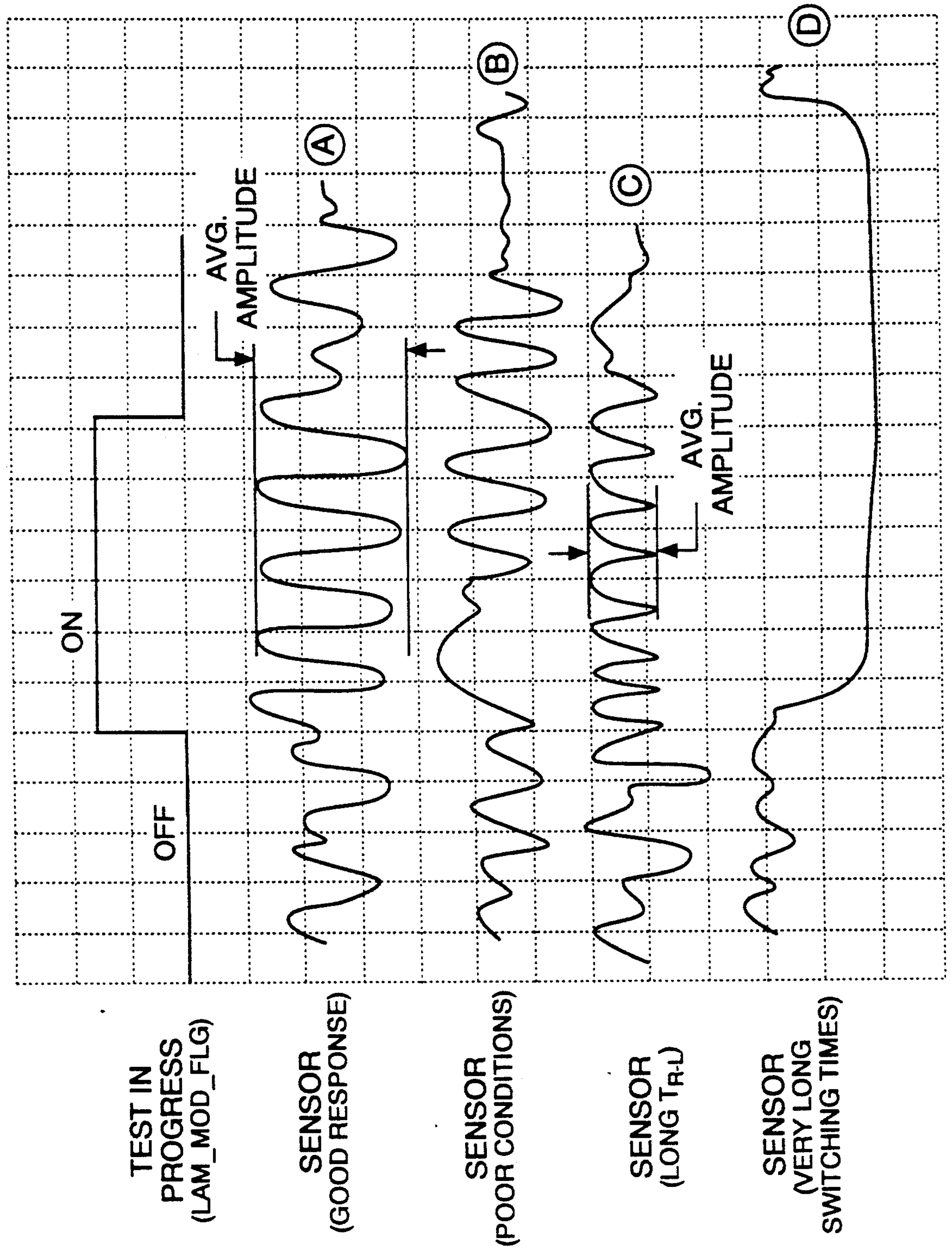
FIG. 7 is graph illustrating various sensor output signals indicating various sensor operating conditions in response to application of the interrogation signal to the sensor.

With reference now to FIG. 7, there is shown a graphical illustration of oxygen sensor output signals during forced fuel modulation associated with various stages of sensor condition. Generally, trace A is indicative of a good oxygen sensor response and a good sensor, and average amplitude is calculated; trace B indicates poor test conditions, requiring a retest of the sensor and average amplitude is not calculated; trace C indicates an oxygen sensor with a long rich-to-lean switching time ($T_{R-L}$), but sufficient to permit average amplitude to be calculated; and trace D indicates an oxygen sensor with very long switching times (i.e. amplitude set to zero).

Figure 8:
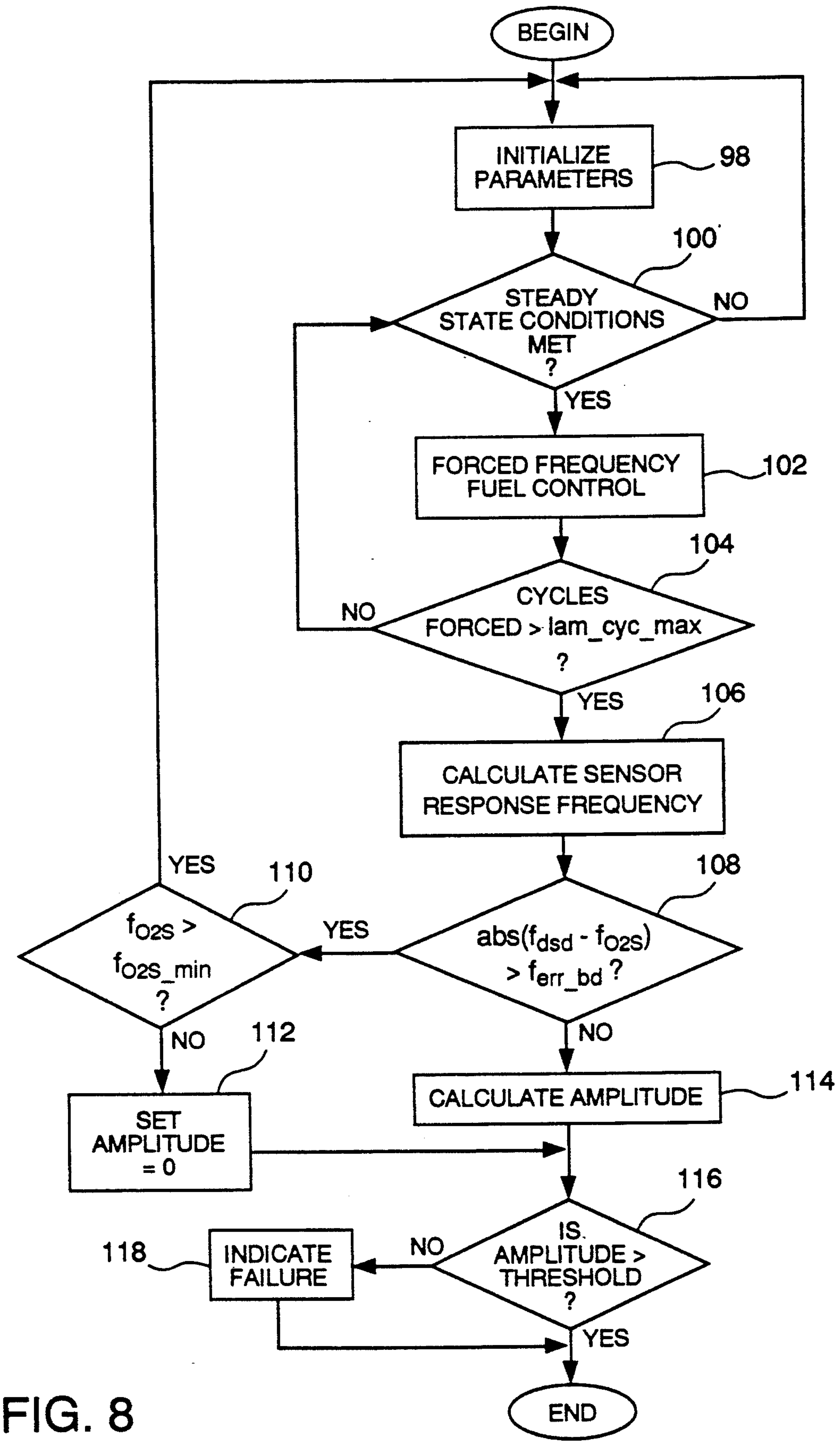
FIG. 8 is a flowchart detailing a second methodology for monitoring operation of the oxygen sensor according to the present invention.

Turning now to FIG. 8, there is shown a flowchart detailing the steps for an alternative oxygen sensor monitoring scheme of the present invention. Similar to the flowchart shown in FIG. 6, this scheme provides a methodology whereby the sensor response rate can be verified prior to accepting the results. At step 98, the test is initialized and flow proceeds to step 100, at which point the controller determines whether or not steady state conditions, such as engine speed, vehicle speed, load and temperature, and the like, are met. Once the conditions are met, at step 102 a flag (LAM_MOD_FLG) is set indicating forced frequency fuel control as defined by the previous pages is being executed.

In this embodiment, the controller determines whether the number of forced fuel excursions or cycles commanded exceeds a variable lam_cyc_max. As shown, steps 100-104 comprise a loop that is repeated for example every 50 mS until the number of forced fuel cycles has exceeded lam_cyc_max, at which point control flow proceeds to step 106. At step 106, the controller determines the frequency of oxygen sensor response ($f_{O2S}$) to the commanded forced fuel excursions. Typically, the driven frequency should match the measure frequency, although a sensor will not automatically be failed if the driven and response frequencies do not match.

With continuing reference to FIG. 8, at step 108 the controller determines whether the measured frequency of the oxygen sensor response was acceptable, by taking the absolute value of the difference between the forced frequency (i.e. $f_{dsd} \approx 2$ Hz) and the oxygen sensor response frequency ($f_{O2S}$), and comparing the difference to a predetermined limit ($f_{err-bd} \approx 0.2$ Hz or $\pm 10\%$). If the difference is not within the prescribed limit, sensor operation is suspect and control flow skips to step 110, and the controller determines whether the sensor response frequency is above a predetermined minimum acceptable frequency ($f_{O2S-min}$). If the condition at step 110 is satisfied, control flow skips back to step 100 and the test is rerun. If, however, the sensor response frequency is unsatisfactory, control flow proceeds to step 112 at which the variable representing the sensor output voltage amplitude is set to zero to indicate a faulty sensor.

As shown, if the difference between the commanded fuel excursion frequency and the sensor response frequency at step 108 is within the frequency error band, the test was valid and control flow proceeds to step 114, wherein the sensor output amplitude is calculated. Typically, acceptable sensor amplitudes would be in the range of 0.5–0.9 $V_{pp}$. At step 116, the sensor amplitude is compared to a predetermined amplitude threshold, such as 0.5 $V_{pp}$. The value of the threshold is set to indicate the emissions standard have been exceeded by a factor of 1.5, in accordance with OBD-II regulations. If the actual amplitude does not exceed the threshold, control flow proceeds to step 118 and a sensor failure is indicated. If, however, the actual amplitude does exceed the threshold, there is no sensor failure and the routine is exited.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention as disclosed.

We claim:

1. For use with a vehicle including an electronic control unit for controlling fuel supply to an internal combustion engine having an oxygen sensor for sensing engine exhaust gas oxygen level, a method of monitoring operation of the sensor, the method comprising:

generating a modulated air-fuel signal having a modified square-wave waveform, the modified square-wave waveform being designed to produce a particular engine exhaust response for interrogating the oxygen sensor;

operating the engine based on the modulated air-fuel signal, the oxygen sensor producing an associated output signal in response to sensed exhaust gas oxygen levels; and processing the output signal of the oxygen sensor associated with the particular engine response so as to determine the operating condition of the oxygen sensor.

2. The method of claim 1 further comprising:

generating a symmetrical air-fuel modulation signal;

generating an asymmetrical air-fuel feedback signal based on an output signal from the oxygen sensor; and summing the symmetrical air-fuel modulation signal and the asymmetrical air-fuel feedback signal to obtain the modulated air-fuel signal having an asymmetrical modified square-wave waveform designed to produce a particular engine exhaust response, the exhaust gas oxygen levels being sensed while controlling the engine based on the modulated air-fuel signal.

3. The method of claim 2 wherein the asymmetrical air-fuel feedback signal has a value which increases over time as the air-fuel ratio becomes lean and has a value which decreases over time as the air-fuel ratio becomes rich.

4. The method of claim 3 wherein the symmetrical air-fuel modulation signal has a square-wave waveform having a frequency of approximately 2 Hertz and an amplitude which provides peak-to-peak fluctuation in a normalized engine air-fuel ratio of about 10%-20%.

5. The method of claim 1 further comprising:

applying a plurality of forced fuel excursions at a predetermined frequency to the engine utilizing the modulated air-fuel signal;

processing the output signal of the sensor to determine a response frequency of the sensor to the forced fuel excursions;

comparing the predetermined frequency of the forced fuel excursions to the response frequency of the sensor; and identifying an operating condition of the sensor based on the comparison of the predetermined frequency of the forced fuel excursions to the response frequency of the sensor.

6. The method of claim 5 further comprising:

determining the amplitude of the sensor output signal based on the comparison of the predetermined frequency of the forced fuel excursions to the response frequency of the sensor;

comparing the amplitude of the sensor output signal to a predetermined acceptable amplitude threshold; and identifying an operating condition of the sensor based on the comparison of the amplitude of the sensor output signal to the predetermined acceptable amplitude threshold.

7. The method of claim 6 further comprising:

comparing the response frequency of the sensor to a predetermined acceptable response frequency threshold; and verifying acceptable test conditions based on the comparison of the response frequency of the sensor to a predetermined acceptable response frequency threshold.

8. For use with a vehicle including an electronic control unit for controlling fuel supply to an internal combustion engine having an oxygen sensor for sensing engine exhaust gas oxygen level, a method of monitoring operation of the sensor, the method comprising:

generating a symmetrical air-fuel modulation signal;

generating an asymmetrical air-fuel feedback signal based on an output signal from the oxygen sensor;

summing the symmetrical air-fuel modulation signal and the asymmetrical air-fuel feedback signal to obtain a modulated air-fuel signal having an asymmetrical modified square-wave waveform designed to produce a particular engine exhaust response for interrogating the oxygen sensor;

operating the engine based on the modulated air-fuel signal, the oxygen sensor producing an associated output signal in response to sensed exhaust gas oxygen levels; and processing the output signal of the oxygen sensor while operating the engine based on the modulated air-fuel signal so as to determine the operating condition of the oxygen sensor.

9. The method of claim 8 wherein the asymmetrical air-fuel feedback signal has a value which increases over time as the air-fuel ratio becomes lean and has a value which decreases over time as the air-fuel ratio becomes rich.

10. The method of claim 9 wherein the symmetrical air-fuel modulation signal has a square-wave waveform having a frequency of 2 Hertz and an amplitude which provides peak-to-peak fluctuation in the engine air-fuel ratio of about 10%-20%.

11. The method of claim 8 further comprising:

applying a plurality of forced fuel excursions at a predetermined frequency to the engine utilizing the modulated air-fuel signal;

processing the output signal of the sensor to determine a response frequency of the sensor to the forced fuel excursions;

comparing the predetermined frequency of the forced fuel excursions to the response frequency of the sensor; and identifying an operating condition of the sensor based on the comparison of the predetermined frequency of the forced fuel excursions to the response frequency of the sensor.

12. The method of claim 11 further comprising:

determining the amplitude of the sensor output signal based on the comparison of the predetermined frequency of the forced fuel excursions to the response frequency of the sensor;

comparing the amplitude of the sensor output signal to a predetermined acceptable amplitude threshold; and identifying an operating condition of the sensor based on the comparison of the amplitude of the sensor output signal to the predetermined acceptable amplitude threshold.

13. The method of claim 12 further comprising:

comparing the response frequency of the sensor to a predetermined acceptable response frequency threshold; and verifying acceptable test conditions based on the comparison of the response frequency of the sensor to a predetermined acceptable response frequency threshold.

14. For use with a vehicle including an electronic control unit for controlling fuel supply to an internal combustion engine having an oxygen sensor for sensing engine exhaust gas oxygen level, a method of monitoring operation of the sensor, the method comprising:

applying a plurality of forced fuel excursions at a predetermined frequency to the engine utilizing a modulated air-fuel signal having a modified square-wave waveform designed to produce a particular engine exhaust response for interrogating the oxygen sensor;

comparing the number of forced fuel excursions applied to the engine to a predetermined fuel excursion threshold;

processing an output signal of the oxygen sensor to determine a response frequency of the sensor to the applied forced fuel excursions;

comparing the predetermined frequency of the forced fuel excursions to the response frequency of the sensor; and identifying an operating condition of the sensor based on the comparison of the predetermined frequency of the forced fuel excursions to the response frequency of the sensor.

15. The method of claim 14 further comprising:

determining the amplitude of the sensor output signal based on the comparison of the predetermined frequency of the forced fuel excursions to the response frequency of the sensor;

comparing the amplitude of the sensor output signal to a predetermined acceptable amplitude threshold; and identifying an operating condition of the sensor based on the comparison of the amplitude of the sensor output signal to the predetermined acceptable amplitude threshold.

16. The method of claim 15 further comprising:

processing the output signal of the sensor to determine the oxygen sensor response frequency to the applied excursions;

comparing the oxygen sensor response frequency to a desired oxygen sensor response frequency; and verifying acceptable test conditions based on the comparison of the oxygen sensor response frequency to the desired oxygen sensor response frequency.

17. The method of claim 16 wherein the desired oxygen sensor response frequency is determined based on the frequency of the forced fuel excursions.

18. The method of claim 16 further comprising:

comparing the oxygen sensor response frequency to a predetermined minimum acceptable response frequency threshold; and verifying acceptable test conditions based on the comparison of the oxygen sensor response frequency to the predetermined minimum acceptable response frequency threshold.

19. The method of claim 18 further comprising reapplying a plurality of forced fuel excursions at the predetermined frequency to the engine utilizing the modulated air-fuel signal to produce a particular engine exhaust response for interrogating the sensor.

20. The method of claim 14 wherein the modified square-wave waveform is asymmetrical.

21. An apparatus, for use with a vehicle including an internal combustion engine having an oxygen sensor for sensing engine exhaust gas oxygen level, for monitoring operation of the sensor, the apparatus comprising:

means for generating a symmetrical air-fuel modulation signal;

means for generating an asymmetrical air-fuel feedback signal based on an output signal from the oxygen sensor;

combining means for summing the symmetrical air-fuel modulation signal and the asymmetrical air-fuel feedback signal to obtain a modulated air-fuel signal having an asymmetrical modified square-wave waveform designed to produce a particular engine exhaust response for interrogating the oxygen sensor, the engine being operated based on the modulated air-fuel signal, the oxygen sensor producing an associated output signal in response to sensed exhaust gas oxygen levels; and control means for processing the output signal of the oxygen sensor while operating the engine based on the modulated air-fuel signal so as to determine the operating condition of the oxygen sensor.

* * * * *

UNITED STATES PATENT AND TRADEMARK OFFICE
Certificate

Patent No. 5,325,711 Patented: July 5, 1994

On petition requesting issuance of a certificate for correction of inventorship pursuant to 35 U.S.C. 256, it has been found that the above-identified patent, through error and without any deceptive intent, improperly sets forth the inventorship.

Accordingly, it is hereby certified that the correct inventorship of this patent is: Douglas R. Hamburg, Bloomfield Hills, Mich.; Thomas S. Gee, Canton, Mich.; Thomas A. Schubert, Novi, Mich.; Paul F. Smith, Dearborn, Mich.; and Michael P. Falandino, Riverview, Mich.

Signed and Sealed this Thirteenth Day of June, 2000.

HEZRON E. WILLIAMS
*Supervisory Patent Examiner*
Art Unit 2856